United States Patent [19]

Maass

[11] Patent Number: 4,976,067
[45] Date of Patent: Dec. 11, 1990

[54] SEALING STRIPS

[75] Inventor: Klaus P. Maass, Viersen, Fed. Rep. of Germany

[73] Assignee: Draftex Industries Limited, Edinburgh, United Kingdom

[21] Appl. No.: 386,288

[22] Filed: Jul. 27, 1989

[30] Foreign Application Priority Data

Aug. 1, 1988 [GB] United Kingdom ............... 8818262

[51] Int. Cl.⁵ .................................................. E05F 11/38
[52] U.S. Cl. ...................................... 49/377; 277/34; 49/477
[58] Field of Search ................ 49/374, 377, 477, 375; 277/34

[56] References Cited

U.S. PATENT DOCUMENTS

| | | | |
|---|---|---|---|
| 2,700,196 | 1/1955 | Panhard | 49/477 |
| 2,792,599 | 5/1957 | Gantschnigg et al. | 49/477 |
| 2,844,405 | 7/1958 | Roethel | 49/377 |
| 2,863,681 | 12/1958 | Robbins | 49/477 |
| 3,284,955 | 11/1966 | Schroth | 49/477 |
| 3,449,864 | 6/1969 | Prost-Dame et al. | 277/34 |
| 4,007,536 | 2/1977 | Soderberg | 49/477 X |
| 4,399,317 | 8/1983 | Van Dyk, Jr. | 277/34 X |
| 4,505,483 | 3/1985 | Bent, Jr. | 49/477 X |
| 4,805,347 | 2/1989 | Smith | 49/477 |
| 4,870,783 | 10/1989 | Hermann et al. | 49/477 |

FOREIGN PATENT DOCUMENTS

| | | | |
|---|---|---|---|
| 2211896 | 9/1973 | Fed. Rep. of Germany | 49/477 |
| 3629224 | 3/1988 | Fed. Rep. of Germany | 49/477 |
| 1522014 | 4/1968 | France . | |
| 2283800 | 4/1976 | France . | |
| 2421748 | 11/1979 | France . | |
| 2555650 | 5/1985 | France . | |
| 950062 | 2/1964 | United Kingdom | 49/477 |

Primary Examiner—Gary L. Smith
Assistant Examiner—Michael Milano
Attorney, Agent, or Firm—Leydig, Voit & Mayer

[57] ABSTRACT

A sealing strip for sealing against a raisable and lowerable window glass plane such as in a motor vehicle door, comprises a triangularly shaped air-tight hollow chamber having two relatively rigid sides stiffened by a metal carrier. The third side is a relatively flexible wall. A sealing lip is pivoted on one of the rigid sides and joined by a leg to an intermediate point on the flexible wall. Partial evacuation of the chamber causes the retracted flexible wall to pull the distal tip of the lip into sealing engagement with the window glass. An increase of air pressure within the chamber causes the flexible wall to move outwards so that the force transmitted via the leg pivots the lip and moves it out of sealing engagement with the window glass.

11 Claims, 5 Drawing Sheets

SEALING STRIPS

BACKGROUND OF THE INVENTION

The invention relates to sealing strips. Embodiments of the invention to be more specifically described below are for sealing against movable panels, such as slidable window glass panes in motor vehicle body construction.

BRIEF SUMMARY OF THE INVENTION

According to the invention, there is provided a sealing strip, having a sealing element for sealingly engaging a surface, the sealing element being flexibly mounted adjacent means defining a hollow chamber whose shape is alterable by altering the pressure of a fluid therewithin, and means mechanically connecting the sealing element with a part which moves in response to the shape alteration of the hollow chamber whereby to transmit a mechanical force to the sealing element so as to cause it to move on its flexible mounting between a first position in which it sealingly engages the surface and a second position in which it does not sealingly engage the surface.

According to the invention, there is further provided a sealing strip for mounting adjacent a slidable window pane, comprising means defining a longitudinally extending substantially air-tight hollow chamber having a wall portion which is relatively rigid and another wall portion which is relatively flexible, a sealing lip running longitudinally along the length of the hollow chamber and being flexibly supported on the relatively rigid wall portion and mechanically connected to the relatively flexible wall portion, and means for varying the air pressure within the hollow chamber so as to cause the relatively flexible wall portion to flex and thereby to cause the sealing lip to pivot on its flexible connection between a first position in which it sealingly engages the window glass and a second position in which it does not sealingly engage the window glass.

BRIEF DESCRIPTION OF THE DRAWINGS

Sealing strips embodying the invention will now be described, by way of example only, with reference to the accompanying diagrammatic drawings in which.

DESCRIPTION OF PREFERRED EMBODIMENTS

Figure 1:
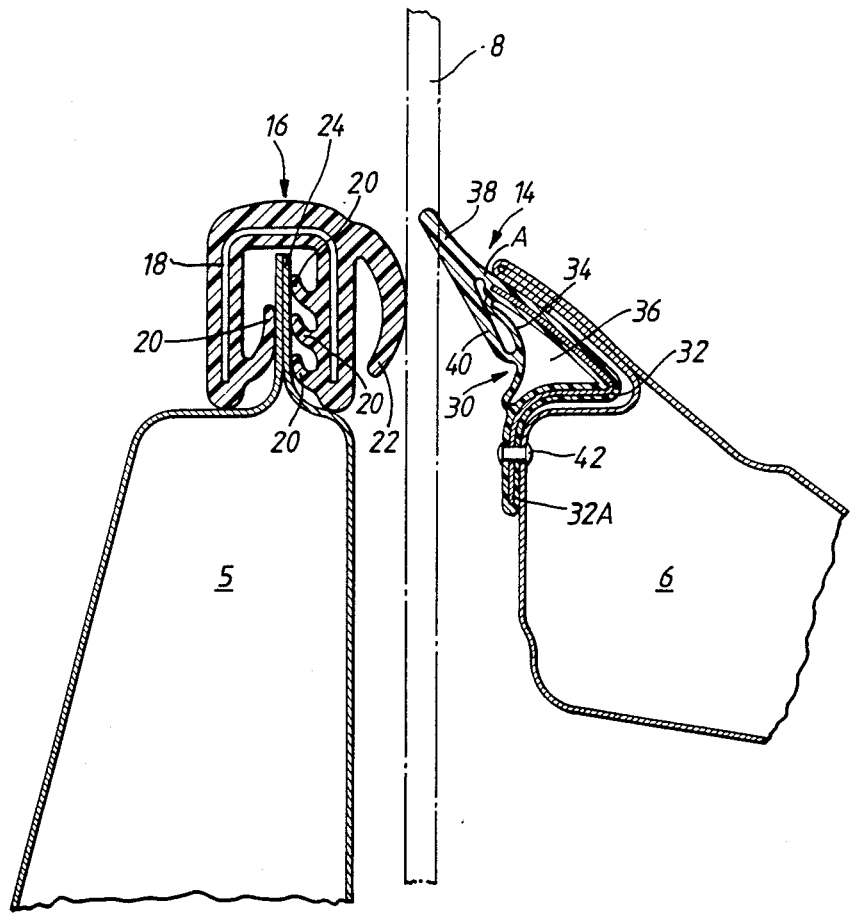
FIG. 1 is a diagrammatic cross-section through one of the sealing strips, in an operative or sealing position.

FIG. 1 shows the inner and outer skins 5, 6 of the lower part of a vehicle door, whose upper part is formed to provide the normal window opening which is closable by a vertically slidable pane of glass 8, the latter being raisable from and lowerable into the hollow lower part of the door. As it is raised and lowered, the window pane 8 passes through a gap between the inner and outer skins of the door.

In order to provide effective weather proof sealing at this point, the inner and outer skins of the door carry sealing strips 14 and 16.

The sealing strip 16 is of conventional form. As shown, it is in the form of a channel-shaped gripping part which is formed from plastics or rubber material extruded over a channel-shaped embedded metal carrier 18. The metal carrier 18 may take any suitable form. For example, it may be a simple metal channel. Instead, it may be a slitted or slotted metal channel. It may be made up of U-shaped metal elements arranged side-by-side to define a channel and either interconnected by short connecting links or entirely disconnected. Instead, it could be made of looped wire. However, other forms of carrier are possible.

The extruded plastics or rubber material is extruded with integrally formed gripping lips 20 and a larger sealing lip 22 on the outside of the channel. The sealing strip 16 is arranged embracingly to grip a flanged joint 24 which is formed where the metal panels forming the inner skin 5 of the door come together. In this way, therefore, the sealing strip 16 supports the lip 22 so that it bears sealingly into engagement with the slidable glass panel 8. The surface of the lip 22 may be covered with flock or other suitable material to provide an effective sealing surface and relatively low friction.

The sealing strip 14 is mounted within a generally triangular-shaped recess 30 formed where the panels forming the outer skin 6 of the door come together. The strip 14 comprises a metal carrier 32 which is shaped to follow the configuration of the recess 30 but with a downwardly depending part 32A. The carrier 32 may be formed from an unapertured metal blank, though could be slitted or slotted. It is covered by extruded plastics or rubber material. The plastics or rubber material is extruded so as to cover and follow the shape of the metal carrier 32 but to provide, in addition, a flexible wall portion 34 defining a hollow closed chamber 36. In addition, the extruded material defines an extended relatively flexible lip 38 having a leg 40 which is anchored along approximately the centre line of the flexible wall portion 34.

The extruded plastics or rubber material need not all be the same hardness. For example, the extruded material following the shape of the metal carrier 32 may be relatively hard and stiff. However, the material defining at least the distal edge of the lip 38, and the flexible wall 34, may be softer and more flexible. The leg 40 may be relatively rigid.

The strip 14 is fixed in position such as by metal clips or suitable fasteners spaced at intervals along the length of the strip such as positioned as shown at 42. Instead, the sealing strip could be fixed in position by any other suitable method, The hollow interior 36 of the strip 14 is connected (by means not shown) to a vacuum pump and is sealed in an air-tight manner.

FIG. 1 shows the seal 14 in its operative or sealing configuration. In this configuration, the hollow chamber 36 is partially evacuated by the vacuum pump. This results in the flexible wall 34 being drawn inwardly of the chamber 36 so as to assume the form illustrated in FIG. 1 and thus to exert a pulling force on the leg 40. This causes the lip 38 to pivot in an anti-clockwise direction about the point A and thus to be drawn into relatively tight sealing engagement with the facing surface of the glass pane 8. A very effective weatherproof seal is therefore provided.

The surface of the lip 8 in engagement with the glass may be covered with flock or other suitable low friction material.

Figure 2:
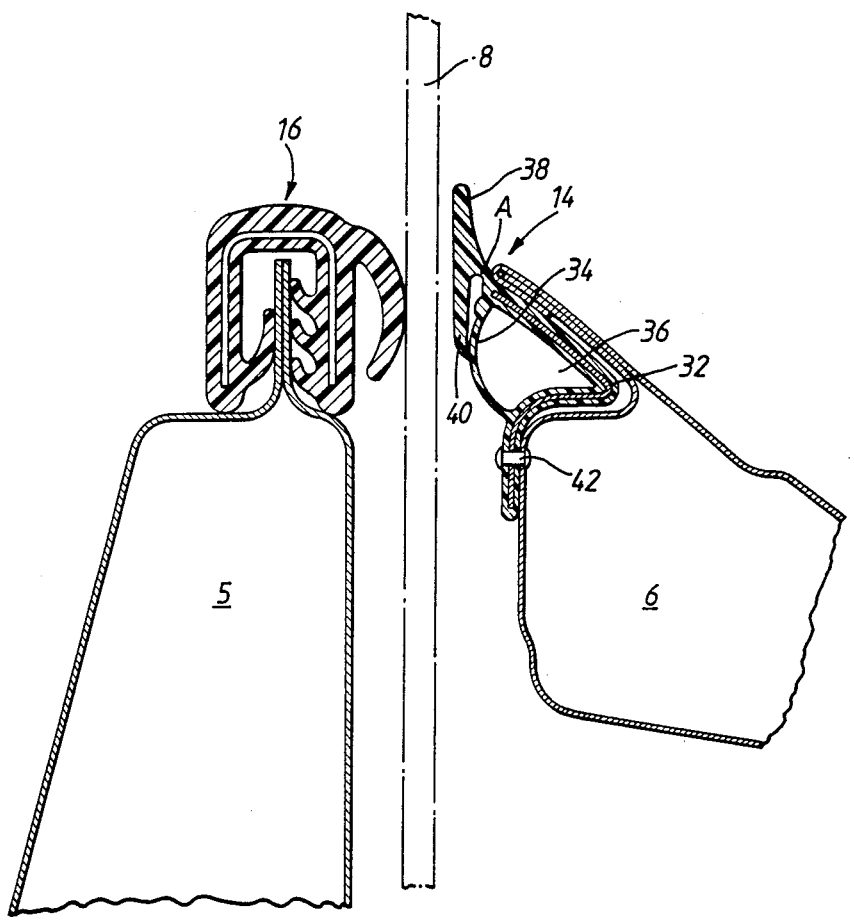
FIG. 2 corresponds to FIG. 1 but shows the sealing strip in an inoperative position.

FIG. 2 shows the configuration which the seal 14 assumes in its inoperative or non-sealing configuration. This is achieved by allowing the air pressure in the chamber 36 to return to atmospheric pressure or, possibly, to be increased above atmospheric pressure. The result of this is that the flexible wall 34 is forced outwardly and pushes on the leg 40 so as to pivot the lip 38 in a clockwise direction about the point A. The tip of the lip 38 is thus moved clear of the window glass.

In this way, the lip 38 can be moved into and out of contact with the window glass 8—by operation of the vacuum pump. Therefore, when it is desired to raise or lower the window pane 8, air is admitted to the hollow chamber 36 so as to move the lip 38 out of engagement with the window glass 8, thereby allowing its free movement. When the window glass has ceased movement (for example, when it has been fully raised or fully lowered), the vacuum pump is operated so as partially to evacuate the hollow chamber 36. In the manner explained, the lip 38 thus moves back into sealing engagement with the window glass. Therefore, there is minimum resistance to movement of the window glass and maximum sealing effect when the movement stops.

The operation of the vacuum pump could be controlled manually. Instead, however, it can be controlled in sequence with the window raising and lowering mechanism.

Figure 3:
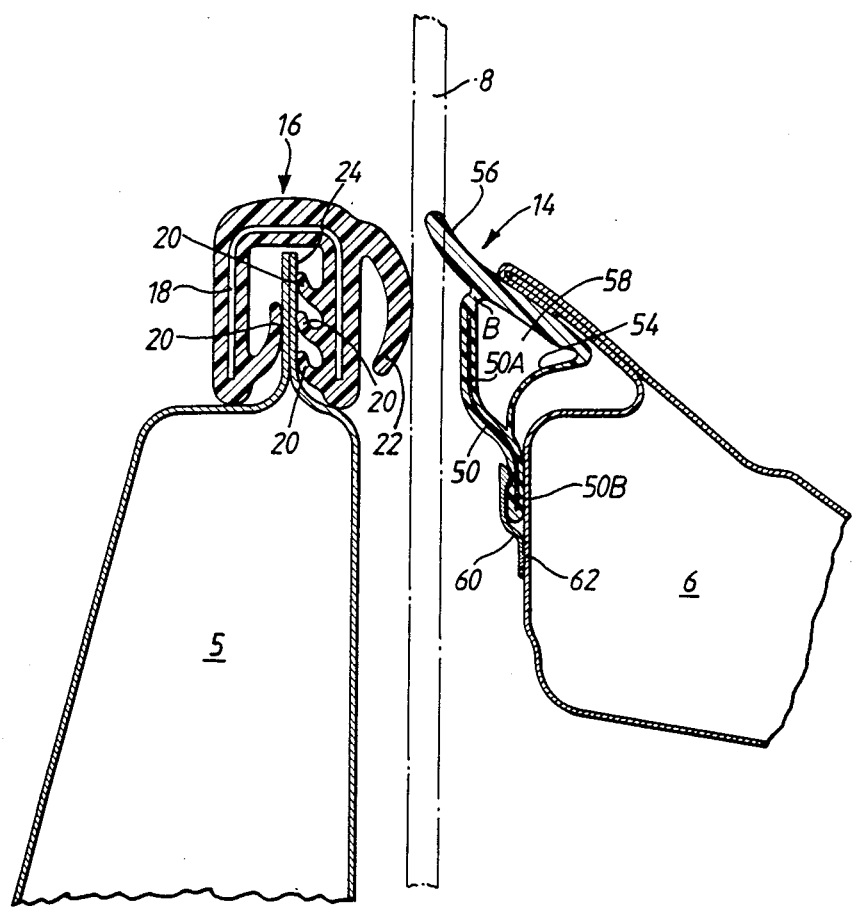
FIG. 3 is a diagrammatic cross-section through another of the sealing strips, showing it in an operative position.

FIG. 3 shows a modified arrangement. In FIG. 3, the seal 16 is of the same form as the seal 16 of FIGS. 1 and 2 and it will not be further described.

Seal 14, however, is of different form from seal 14 of FIGS. 1 and 2.

Figure 4:
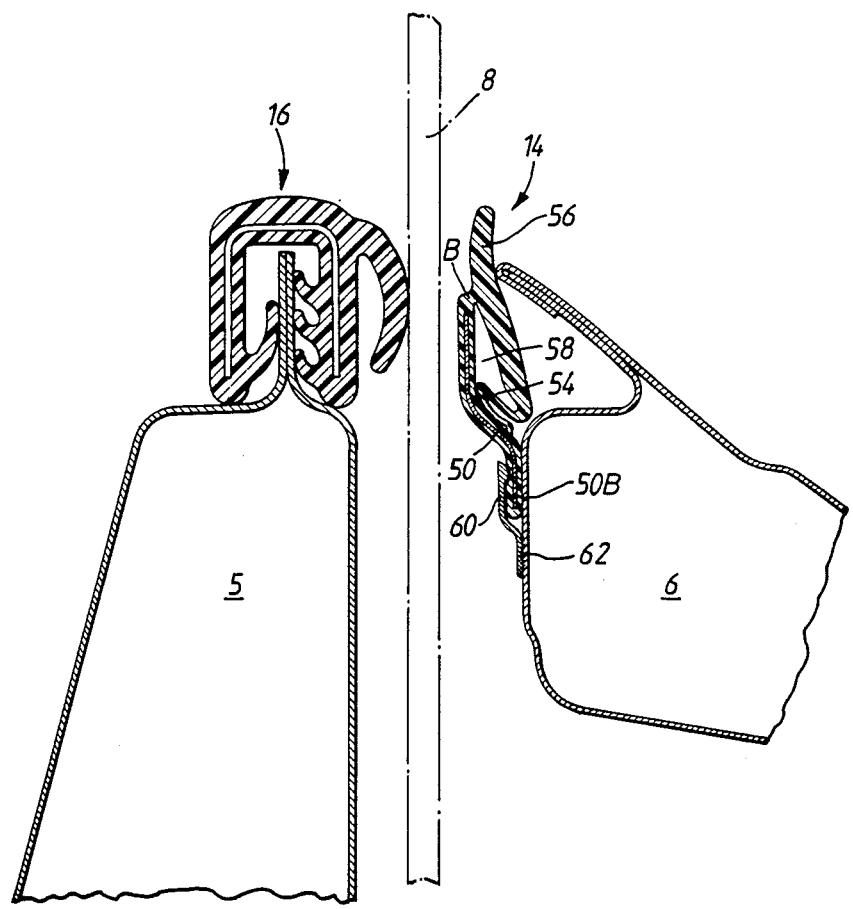
FIG. 4 corresponds to FIG. 3 but shows the sealing strip in an inoperative position.

Seal 14 of FIGS. 3 and 4 includes a metal carrier 50 having a portion 50A which partially closes off the triangular-shaped aperture 30. A portion 52A is attached to the adjacent body panel such as in the same manner as the carrier 32 of the seal 14 of FIGS. 1 and 2 is attached.

The carrier 50 may be formed from an unapertured metal blank or may be formed with slits or slots.

The carrier 50 is enclosed within extruded plastics or rubber material which is co-extruded with and to form a flexible wall portion 54 integrally connected to thicker extruded material which is pivotted at B to, and integrally connected to, the material covering the metal carrier and which extends to form a lip 56. The extruded material thus defines a hollow chamber 58.

Chamber 58 is connected to a vacuum pump and is arranged to be air-tight.

FIG. 3 shows the sealing strip 14 in its operative or sealing position. Here, the air pressure within the chamber 58 is atmospheric or above atmospheric and this tends to straighten the flexible wall 14, thus tending to pivot the lip 56 in an anti-clockwise direction about point B. The distal tip of the lip is thus pressed into sealing engagement with the corresponding surface of the window glass 8 so as to form a weather tight seal. Again, the tip of the lip where it engages the window glass may be covered with flock or similar material.

FIG. 4 shows the seal 14 of FIG. 3 in its inoperative or non-sealing position. This is achieved by partially evacuating the chamber 58, by means of the vacuum pump. This partially collapses the flexible wall 54 and thus pivots the lip 56 in a clockwise direction about pivot point B. The distal edge of the lip moves clear of the window glass 8.

Therefore, the seal shown in FIGS. 3 and 4 moves into the inoperative or non-sealing position when the hollow chamber is partially evacuated and moves into the sealing position when the air pressure is increased. Its operation, in terms of the pressure within the hollow chamber, is thus the reverse of the arrangement shown in FIGS. 1 and 2. The seal of FIGS. 3 and 4 may be operated in sequence with the raising and lowering of the window glass 8 in similar fashion to that already described with reference to FIGS. 1 and 2.

FIGS. 3 and 4 show a different method of fixing the seal 14 in position. Here the position of the extruded material embedding the carrier position 50B is held in a clip 60 welded at 62 to the adjacent door panel.

Figure 5:
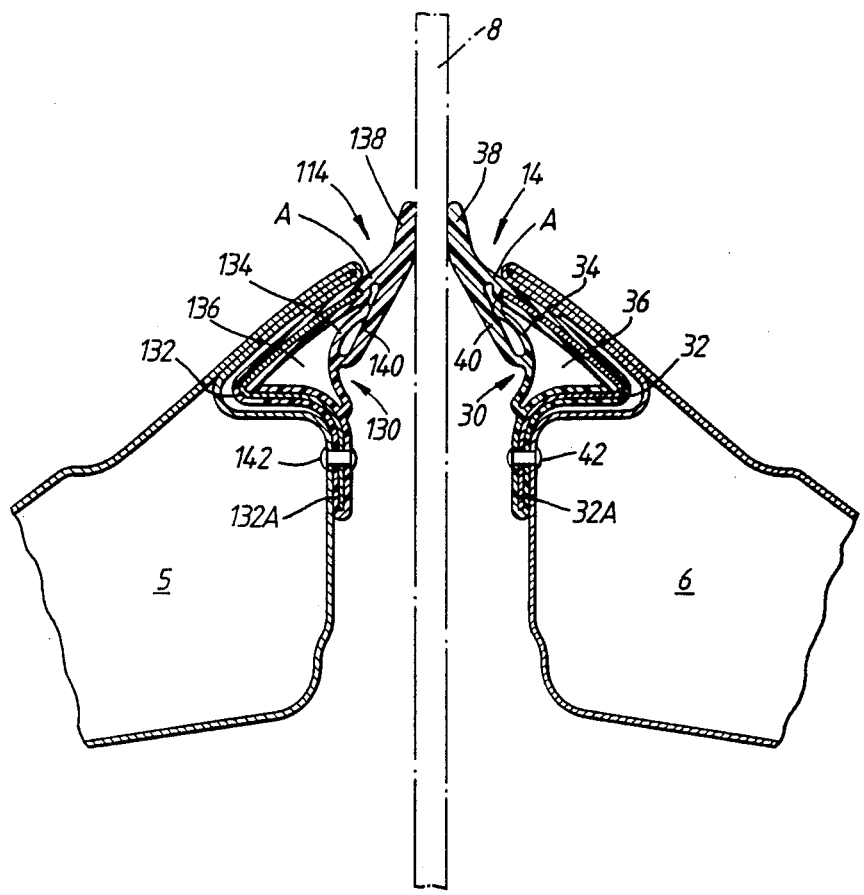
FIG. 5 shows a modification.

It will be understood that in both of the arrangements shown, the seal 16 could be replaced by a seal 14 (either in the version shown in FIGS. 1 and 2 or in the version shown in FIGS. 3 and 4). One such arrangement is shown in FIG. 5. This shows the sealing strip 14 of FIGS. 1 and 2 on the right hand side of the window glass 8. However, instead of the sealing strip 16 on the left hand side of the window glass 8, as shown in FIGS. 1 and 2, a second sealing strip 114 is shown which corresponds to the sealing strip 14 (and is operated in the same way). Parts of sealing strip 114 corresponding to parts of sealing strip 14 have the same references, except for the addition of the prefix "1".

It will also be appreciated that the configurations of the seals 14 may be changed from those shown.

What is claimed is:

1. A sealing strip for mounting adjacent a slidable window pane, comprising:
   means defining a longitudinally extending substantially air-tight hollow chamber having a wall portion which is relatively rigid and another wall portion which is relatively flexible,
   a sealing lip running longitudinally along the length of the hollow chamber and being flexibly supported on the relatively rigid wall portion and mechanically connected to the relatively flexible wall portion, and
   means for varying the air pressure within the hollow chamber so as to cause the relatively flexible wall portion to flex and thereby to cause the sealing lip to pivot on its flexible connection between a first position in which it sealingly engages the window glass and a second position in which it does not sealingly engage the window glass,
   the hollow chamber being substantially triangular in cross-section with the relatively rigid wall portion comprising two of its sides and the relatively flexible wall portion defining its third side, the sealing lip extending away from and being flexibly mounted at the edge running longitudinally of the hollow chamber at a corner of its cross-section between the relatively rigid wall portion and the relatively flexible wall portion, and including a leg external to the hollow chamber and connecting an intermediate part of the flexible wall portion to the sealing lip,
   whereby reduction of air pressure within the hollow chamber draws the flexible wall portion inwardly of the hollow chamber and exerts a pulling force on the sealing lip via the said leg so as to move the lip into the said first position, and increase of air pressure within the hollow chamber results in the flexible wall portion flexing outwardly of the hollow chamber and moving the sealing lip into the said second position.

2. A strip according to claim 1, in which the hollow chamber is made of extruded material and is integrally extruded with further material defining the sealing element.

3. A strip according to claim 1, in which the relatively rigid wall portion includes a relatively rigid embedded metal carrier.

4. A strip according to claim 1, and mounted in a vehicle door which has a hollow enclosed lower part and an upper part constituting a window, the strip being positioned along one side of an opening between the lower and upper parts of the door and through which the window glass descends into and ascends from the hollow enclosed lower part of the door.

5. A strip according to claim 4, in combination with another similar strip also positioned along the door but on the opposite side of the window glass.

6. A strip according to claim 1, in combination with means for controlling the evacuation of air from and the admission of air to the hollow chamber in synchronism with operation of a mechanism for sliding the window glass.

7. A sealing strip, for mounting adjacent a slidable window pane, comprising means defining a longitudinally extending substantially air-tight hollow chamber having a wall portion which is relatively rigid and another wall portion which is relatively flexible, a sealing lip running longitudinally along the length of the hollow chamber and being flexibly supported on the relatively rigid wall portion and mechanically connected to the relatively flexible wall portion, and means for varying the air pressure within the hollow chamber so as to cause the relatively flexible wall portion to flex and thereby to cause the sealing lip to pivot on its flexible connection between a first position in which it sealingly engages the window glass and a second position in which it does not sealingly engage the window glass, the hollow chamber being substantially triangular in cross-section with the relatively rigid wall portion defining first and second sides and the relatively flexible wall portion defining its third side, said first and second sides being pivotted together at their join and with one of the first or second sides being extended away from the hollow chamber to form a lip constituting the said sealing element, whereby a reduction in air pressure within the hollow chamber causes the flexible wall portion to move inwardly of the hollow chamber and so to pivot the said first one of the sides as to move the sealing lip into the said second position, and increase of air pressure within the hollow chamber causes the flexible wall portion to move outwardly of the hollow chamber whereby to pivot the said first side in the opposite direction thereby moving the sealing lip into the said first position.

8. A strip according to claim 7, in which the hollow chamber is made of extruded material and is integrally extruded with further material defining the sealing element.

9. A strip according to claim 7, in which the relatively rigid wall portion includes a relatively rigid embedded metal carrier.

10. A strip according to claim 7, and mounted in a vehicle door which has a hollow enclosed lower part and an upper part constituting a window, the strip being positioned along one side of an opening between the lower and upper parts of the door and through which the window glass descends into and ascends from the hollow enclosed lower part of the door.

11. A strip according to claim 7, in combination with means for controlling the evacuation of air from and the admission of air to the hollow chamber in synchronism with operation of a mechanism for sliding the window glass.

* * * * *